A. G. BARRON.
DUSTER.
APPLICATION FILED APR. 14, 1915.
1,153,011.
Patented Sept. 7, 1915.
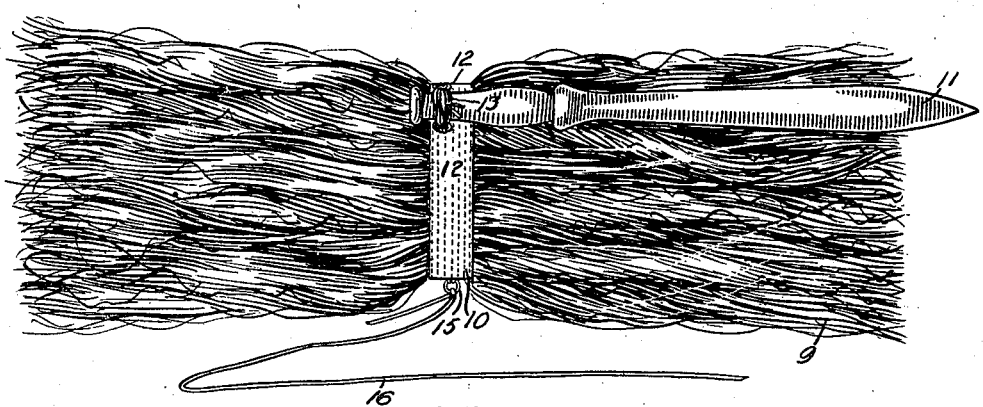
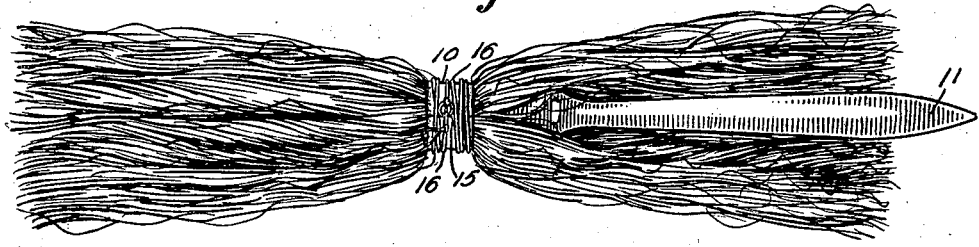
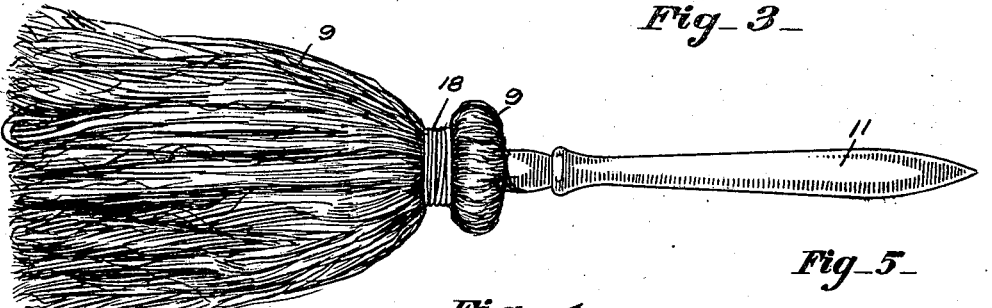
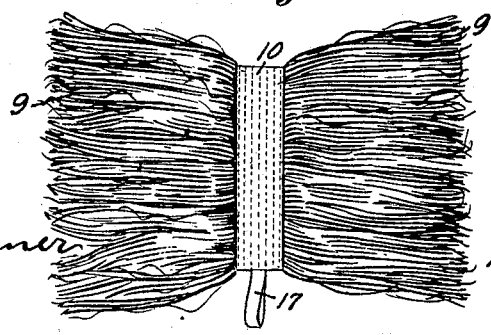
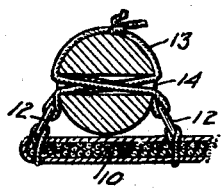
WITNESSES:
INVENTOR
A. G. Barron.
BY
ATTORNEYS

UNITED STATES PATENT OFFICE.

ANASTASIA G. BARRON, OF NEW YORK, N. Y., ASSIGNOR TO CHESTER G. BARRON AND WILLIAM V. BARRY, BOTH OF BROOKLYN, NEW YORK.

DUSTER.

1,153,011. Specification of Letters Patent. Patented Sept. 7, 1915.

Application filed April 14, 1915. Serial No. 21,301.

*To all whom it may concern:*

Be it known that I, ANASTASIA G. BARRON, a citizen of the United States, and a resident of the city of New York, borough of Brooklyn, in the county of Kings and State of New York, have invented a new and Improved Duster, of which the following is a full, clear, and exact description.

Among the principal objects which the present invention has in view are: to provide a duster which may be laundried; to provide means for readily and easily detaching the duster portion and handle therefor; to provide a convenient and substantial means for constructing the wiping body of a duster; and to provide a duster having a wiping body constructed from cord ends.

*Drawings:* Figure 1 is a plan view of a handle and a wiping body constructed and arranged in accordance with the present invention, said handle and said body being shown as partly disengaged; Fig. 2 is a similar view showing the wiping body and handle, and means for securing the same in operative relation; Fig. 3 is a side view of the completed duster; Fig. 4 shows a modified form of the duster body intended for employment without a stiff or rigid handle; Fig. 5 is a detail view showing an end fragment of a handle.

*Description:* As shown in the drawings, the body portion 9 of the duster consists of a multiplicity of comparatively short lengths of cord. The short lengths of cord forming the body portion 9 are centrally bound by a girdle 10. The girdle 10 is constructed of tape of any convenient width and strength. The tape forming the girdle 10 is preferably overlaid upon a skein of cord of suitable weight, the girdle being formed at the center of said skein. The sides of the girdle 10 are sewed rigidly together by being stitched, as shown best in Figs. 1 and 4 of the drawings, the stitching passing through the sides of the girdle and through the cord forming the body portion 9. After the girdle is completed, and the strands of the body portion held rigidly thereby, the skeins from which the body portion 9 is formed, are then severed or parted on the fold thereof. A tassel-like body is thus formed. When the body portion 9 is to be used in conjunction with a stiff handle 11, the girdle 10 is furnished with small eyelets 12. The eyelets 12 are spaced apart, as shown best in Fig. 1 of the drawings, to form convenient anchorage for the tying cord 13. As shown best in Fig. 5 of the drawings, the cord 13 is passed through a hole 14 formed in one end of said handle 11. A third eyelet 15 is sewed or otherwise secured at the end of the girdle 10, as shown best in Figs. 1 and 2 of the drawings. When the girdle 10 is wrapped about the end of the handle, as shown best in Fig. 2 of the drawings, the eyelet 15 is exposed and overlaid upon the outer side of the girdle 10. In this position of the girdle, the wrapping cord 16 is wound about the girdle, binding the same tightly upon the handle 11. The ends of the wrapping cord 16 are then securely tied to form a structure such as shown in Fig. 2 of the drawings. When now the operator, grasping the handle 11, lifts the same to a position where all of the short lengths of the body 9 become pendent, as shown in Fig. 3 of the drawings, the duster is found by the cord 18 ready for service. The service to which the duster is put is in many respects the same as that in which a feather duster is employed. When in the course of operation the body portion 9 becomes soiled, the short lengths of said body portion which in service cover the outside of the girdle 10, are moved back to the position shown in Fig. 2 of the drawings. The wrapping cord 16 is then unwound, and the girdle 10 is unwrapped from about the handle 11 to the position shown in Fig. 1 of the drawings. The tying cord 13 is thereby exposed so that it may be untied and removed from engagement with the handle 11 and the hole 14 thereof. The body portion 9 will now be found to be entirely free from attachment to the handle 11, and, being constructed of a washable material, may be easily and freely laundried.

In the modified form shown in Fig. 4 of the drawings, the handle 11 is omitted and a loop 17 is provided, through which, when in service, the thumb of the operator may be passed. The loop 17 may, after the duster has been employed in its ordinary function, be used for hanging said duster to store or dry the same.

Claims:

1. A duster comprising a body portion formed from a plurality of short lengths of cord; a girdle surrounding said short lengths at the center thereof, the sides of said girdle being rigidly united through the interposed lengths of cord; a rigid handle for said duster; a plurality of eyelets disposed at one end of said girdle at opposite sides of said handle; and a cord operatively engaged with said eyelets for securing the eyeleted end of said girdle on said handle.

2. A duster comprising a body portion formed from a plurality of short lengths of cord; a girdle surrounding said lengths of cord at the center thereof, the sides of said girdle being rigidly united with each other to bind upon the interposed short lengths of cord; a plurality of eyelets mounted on said girdle, two of said eyelets being disposed in spaced and paired relation at one end of said girdle, and one being disposed at the opposite end of said girdle; a handle disposed between and secured to said paired eyelets for rigidly attaching the adjacent end of said girdle on said handle; and means embodying a flexible binding member and the eyelet at the opposite end of said girdle, adapted for wrapping about said girdle, for holding the same in service relation to said handle.

3. A duster comprising a body portion formed from a plurality of short lengths of cord; a girdle surrounding said lengths of cord at the center thereof, the sides of said girdle being rigidly united with each other to bind upon the interposed short lengths of cord; a plurality of eyelets mounted on said girdle, two of said eyelets being disposed in spaced and paired relation at one end of said girdle, and one being disposed at the opposite end of said girdle; a handle disposed between and secured to said paired eyelets for rigidly attaching the adjacent end of said girdle on said handle; and means embodying a flexible binding member and the eyelet at the opposite end of said girdle, adapted for wrapping about said girdle, for holding the same in service relation to said handle, said flexible member being wrapped upon to form a binding for the outer half of said cord lengths when the same are folded over said girdle, to dispose the ends of said cord lengths all in the same service relation.

In testimony whereof I have signed my name to this specification in the presence of two subscribing witnesses.

ANASTASIA G. BARRON.

Witnesses:
E. MURDOCK,
W. V. BARRY.